United States Patent
Nakayama (10) Patent No.: US 12,202,133 B2
(45) Date of Patent: Jan. 21, 2025

(54) ARM-SHAPED STRUCTURE AND ROBOT

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 18/546,332

(22) PCT Filed: Mar. 25, 2022

(86) PCT No.: PCT/JP2022/014264
§ 371 (c)(1),
(2) Date: Aug. 14, 2023

(87) PCT Pub. No.: WO2022/210329
PCT Pub. Date: Oct. 6, 2022

(65) Prior Publication Data
US 2024/0116198 A1 Apr. 11, 2024

(30) Foreign Application Priority Data

Mar. 31, 2021 (JP) .............................. 2021-058980
Apr. 27, 2021 (JP) .............................. 2021-074937

(51) Int. Cl.
*B25J 18/00* (2006.01)
*B25J 9/00* (2006.01)

(52) U.S. Cl.
CPC ............. *B25J 18/00* (2013.01); *B25J 9/0012* (2013.01); *B25J 18/005* (2013.01)

(58) Field of Classification Search
CPC ............. B25J 9/0012; B25J 18/00; F16L 9/14
See application file for complete search history.

(56) References Cited

U.S. PATENT DOCUMENTS 1,175,402 A * 3/1916 Baylis ..................... A47L 9/242
285/305
2,712,950 A 7/1955 Werner
(Continued)

FOREIGN PATENT DOCUMENTS

CN 106426291 A * 2/2017
JP H08-057791 A 3/1996
(Continued)

OTHER PUBLICATIONS

"A detailed explanation of the outline and process of the CFRP molding method", Toray Carbon MagicCo., Ltd., Shiga, Japan, Retrieved from the Internet in Mar. 2021, URL: https://www.carbonmagic.com/molding.html.

*Primary Examiner* — Adam D Rogers
(74) *Attorney, Agent, or Firm* — Maier & Maier, PLLC (57) ABSTRACT

An arm-shaped structure includes a pipe-shaped main body and an attachment interface joined to at least one end of the main body and securable to another component. At least a portion of the main body and the attachment interface is formed by resin containing a continuous reinforcement fiber. The main body and the attachment interface are joined to each other in a state where relative movement along a longitudinal axis of the main body and around the longitudinal axis is prevented in accordance with engagement between a recess provided in one of the main body and the attachment interface and a protrusion provided in the other one of the main body and the attachment interface.

3 Claims, 11 Drawing Sheets

(56) References Cited

U.S. PATENT DOCUMENTS

| | | | | |
|---|---|---|---|---|
| 4,904,148 | A * | 2/1990 | Larsson | B25J 9/04 |
| | | | | 901/23 |
| 5,242,721 | A * | 9/1993 | Oonuki | B25J 18/00 |
| | | | | 428/113 |
| 10,456,907 | B2 * | 10/2019 | Nakayama | B25J 9/06 |
| 10,870,227 | B2 * | 12/2020 | Nakayama | B29C 45/14614 |
| 11,633,866 | B2 * | 4/2023 | Nakayama | B25J 19/007 |
| | | | | 74/490.05 |
| 11,707,851 | B2 * | 7/2023 | Nakayama | B25J 18/00 |
| | | | | 74/490.01 |
| 11,761,562 | B2 * | 9/2023 | Bernard | F16L 9/14 |
| | | | | 138/174 |
| 11,926,050 | B2 * | 3/2024 | Nakayama | B25J 9/02 |
| 2018/0169760 | A1 * | 6/2018 | Negishi | B22F 3/24 |
| 2022/0381373 | A1 * | 12/2022 | Nakayama | B29C 70/446 |
| 2024/0131732 | A1 * | 4/2024 | Nakayama | B25J 18/00 |
| 2024/0149473 | A1 * | 5/2024 | Nakayama | B25J 18/00 |

FOREIGN PATENT DOCUMENTS

| | | | |
|---|---|---|---|
| JP | 2010-115732 A | | 5/2010 |
| JP | 2010-179386 A | | 8/2010 |
| JP | 2012-161886 A | | 8/2012 |
| JP | 2016-043575 A | | 4/2016 |
| JP | 2018-167338 A | | 11/2018 |
| JP | 2018-176337 A | | 11/2018 |
| JP | 2020-015127 A | | 1/2020 |
| JP | 2020-023045 A | | 2/2020 |
| JP | 2020-082311 A | | 6/2020 |
| JP | 2021-091151 A | | 6/2021 |
| KR | 10-1805304 B1 | | 12/2017 |
| KR | 20240024541 A | * | 2/2024 |
| WO | WO-9316848 A1 | * | 9/1993 ............. B25J 18/00 |

* cited by examiner

ARM-SHAPED STRUCTURE AND ROBOT

TECHNICAL FIELD

The present disclosure relates to arm-shaped structures and robots.

BACKGROUND

In order to ensure enough strength while achieving weight reduction, a known arm of an industrial robot has attachment interfaces joined to opposite ends of a long arm body made of resin by using an adhesive (e.g., see Japanese Unexamined Patent Application, Publication No. 2020-15127).

SUMMARY

An aspect of the present disclosure provides an arm-shaped structure including a pipe-shaped main body and an attachment interface joined to at least one end of the main body and securable to another component. At least a portion of the main body and the attachment interface is formed by resin containing a continuous reinforcement fiber. The main body and the attachment interface are joined to each other in a state where relative movement along a longitudinal axis of the main body and around the longitudinal axis is prevented in accordance with engagement between a recess provided in one of the main body and the attachment interface and a protrusion provided in the other one of the main body and the attachment interface.

A continuous reinforcement fiber is normally defined as a reinforcement fiber that has a length of 10 mm or larger and that is difficult to mold in injection-molding. The length of reinforcement fibers included in resin pellets used for injection-molding is normally about 1 mm for so-called short fibers and about 2 mm for so-called long fibers. If the length is 10 mm or larger, the reinforcement fibers may become entwined with a screw in an injection molder, possibly damaging the injection molder.

DETAILED DESCRIPTION OF EMBODIMENTS

An arm-shaped structure 1 and a robot according to an embodiment of the present disclosure will be described below with reference to the drawings.

The arm-shaped structure 1 according to this embodiment is, for example, a robot arm.

The robot according to this embodiment includes at least one arm-shaped structure 1.

Figure 1:
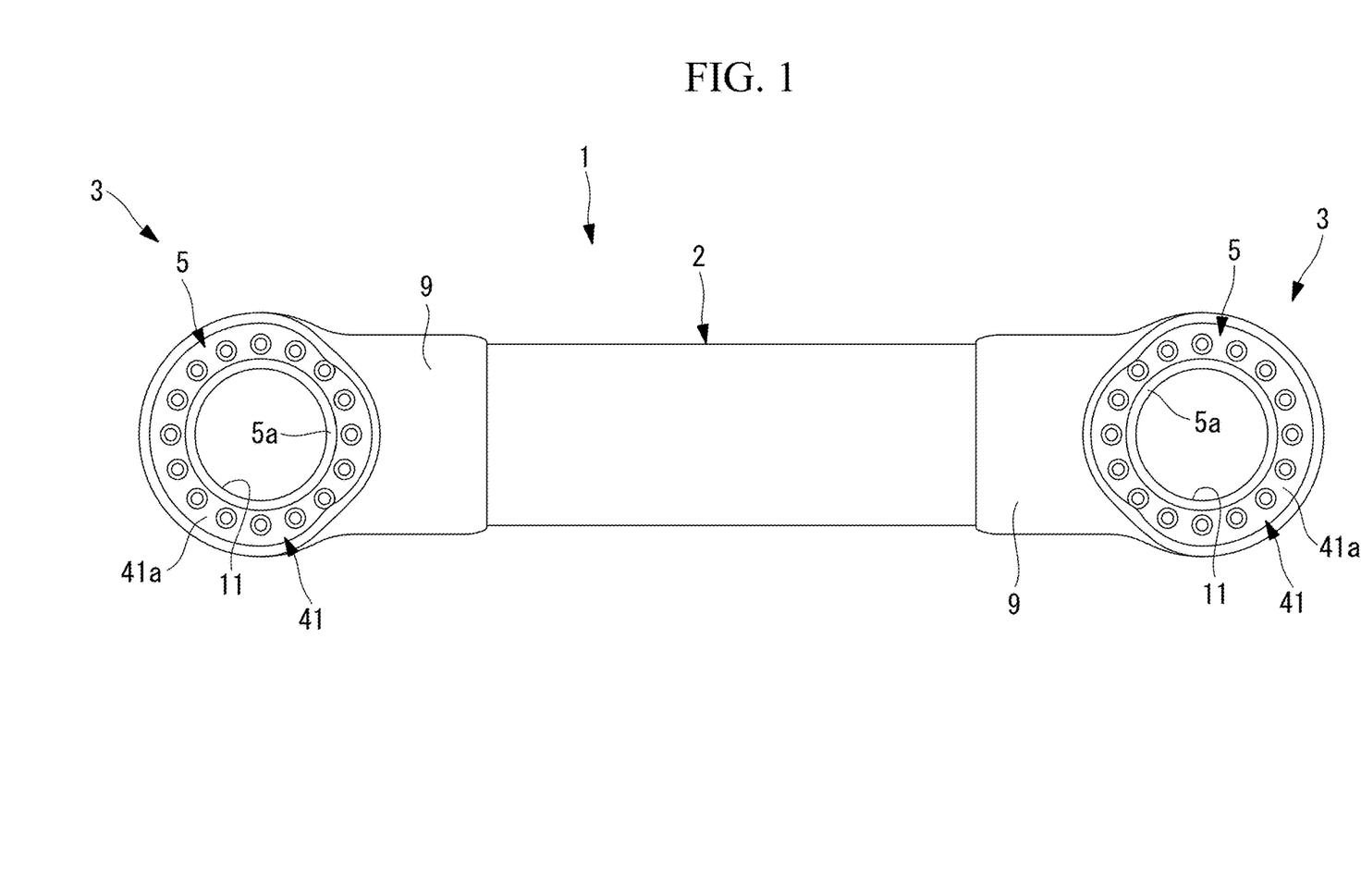
FIG. 1 is a front view illustrating an arm-shaped structure according to an embodiment of the present disclosure.
Figure 2:
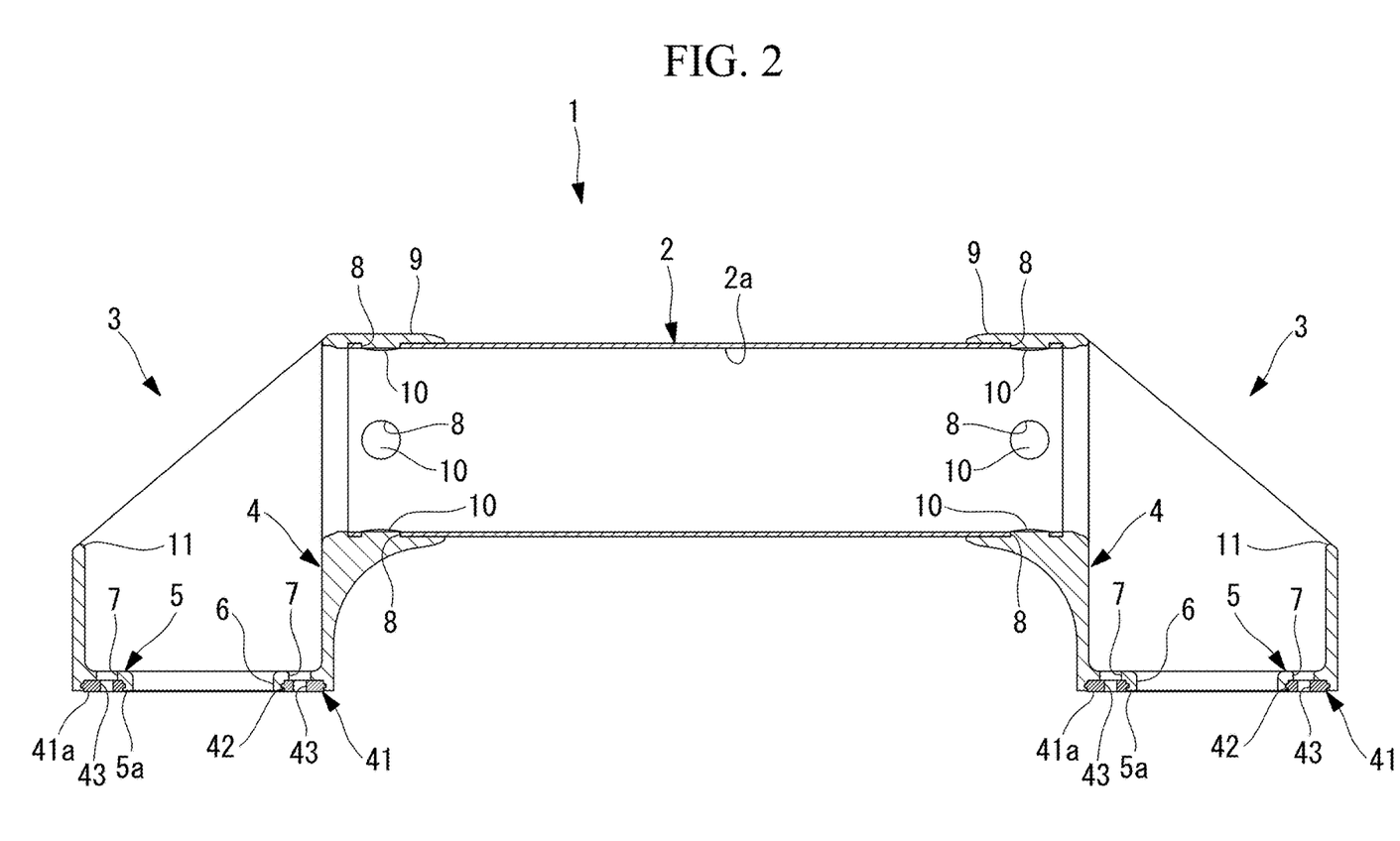
FIG. 2 is a vertical sectional view illustrating the arm-shaped structure in FIG. 1.

As shown in FIGS. 1 and 2, the arm-shaped structure 1 according to this embodiment includes a cylindrical-pipe-shaped main body 2 having an inner hole 2a, and also includes a pair of attachment interfaces 3 joined to opposite longitudinal ends of the main body 2.

At least a portion of the main body 2 is composed of, for example, a carbon-fiber-reinforced plastic (CFRP) containing continuous reinforcement fibers 30.

At least a portion of each attachment interface 3 is also composed of a carbon-fiber-reinforced plastic containing continuous reinforcement fibers 30. Each attachment interface 3 has a hollow section 4 communicating with the inner hole 2a of the main body 2.

Each attachment interface 3 is provided with a ring-shaped flange 5 for securing each attachment interface 3 to another component constituting the robot, for example, an output shaft of a speed reducer. The flanges 5 of the pair of attachment interfaces 3 respectively have flanged surfaces 5a disposed in the same plane that is parallel to a longitudinal axis of the main body 2.

Each flange 5 has a center hole 6 that exposes the hollow section 4 in the center, and also has a plurality of through-holes 7 arranged with a distance therebetween in the circumferential direction around the center hole 6. A wire body, such as a cable, extends through the inner hole 2a of the main body 2 via the center hole 6 in one of the flanges 5, and can be routed from the center hole 6 in the other flange 5 along an extraction path. Each flange 5 is provided within the corresponding hollow section 4 for improving the external appearance of the arm, and has an opening 11 with a relatively large size to allow insertion of a tool or a human hand.

Each attachment interface 3 includes a flat metallic plate 41 embedded in the flange 5.

Figure 3:
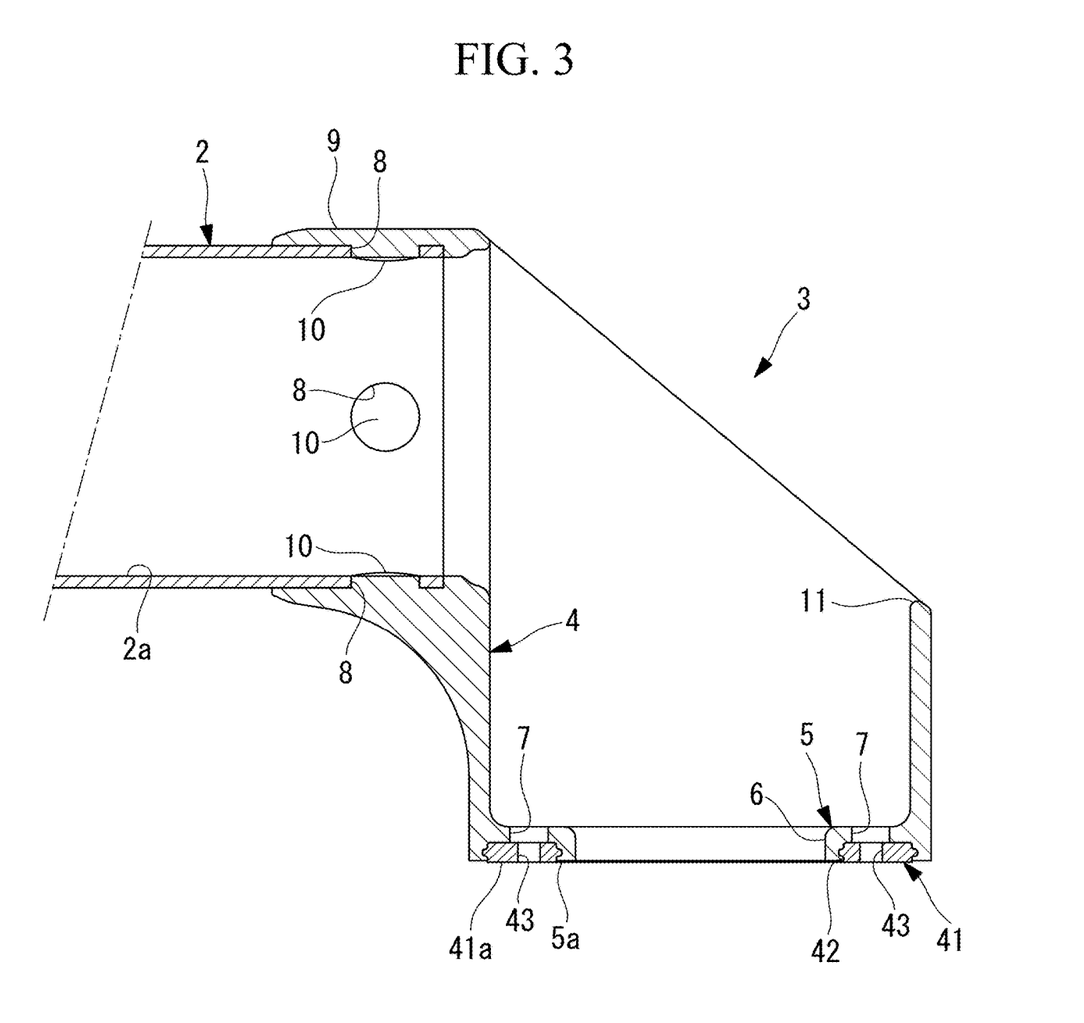
FIG. 3 is a partially-enlarged vertical sectional view illustrating an attachment interface of the arm-shaped structure in FIG. 1.

As shown in FIGS. 1 to 3, the metallic plate 41 is a ring-shaped plate with a center hole 42. The metallic plate 41 has a plurality of through-holes 43 extending therethrough in the thickness direction and provided with a distance therebetween in the circumferential direction.

One of the surfaces of the metallic plate 41 in the thickness direction is an attachment surface 41a. The entire attachment surface 41a is exposed. The other surface of the metallic plate 41 in the thickness direction is partially covered by the resin constituting the flange 5 in a state where the periphery of some of the through-holes 43 is partially exposed within the through-holes 7 in the flange 5. The surface of the metallic plate 41 exposed to the periphery of the through-holes 43 functions as a seating surface for attachment screws (now shown) to be inserted into the through-holes 43.

The main body 2 and the pair of attachment interfaces 3 are joined together in accordance with the following structure.

Specifically, as shown in FIGS. 2 and 3, the main body 2 has through-holes (recesses) 8 extending radially therethrough at positions located away from the opposite longitudinal ends by a predetermined distance. The through-holes 8 are circular in cross section. A plurality of, for example, four, through-holes 8 arranged with a distance therebetween in the circumferential direction is provided in the vicinity of each end.

The attachment interfaces 3 are provided with cylindrical engagement sections 9 and protrusions 10. Each engagement section 9 engages with the outer peripheral surface at each of the opposite ends of the main body 2. The protrusions 10 protrude radially inward from the inner surface of each engagement section 9 and have a complementary shape with the through-holes 8 in the main body 2 to tightly engage therewith.

Figure 4:
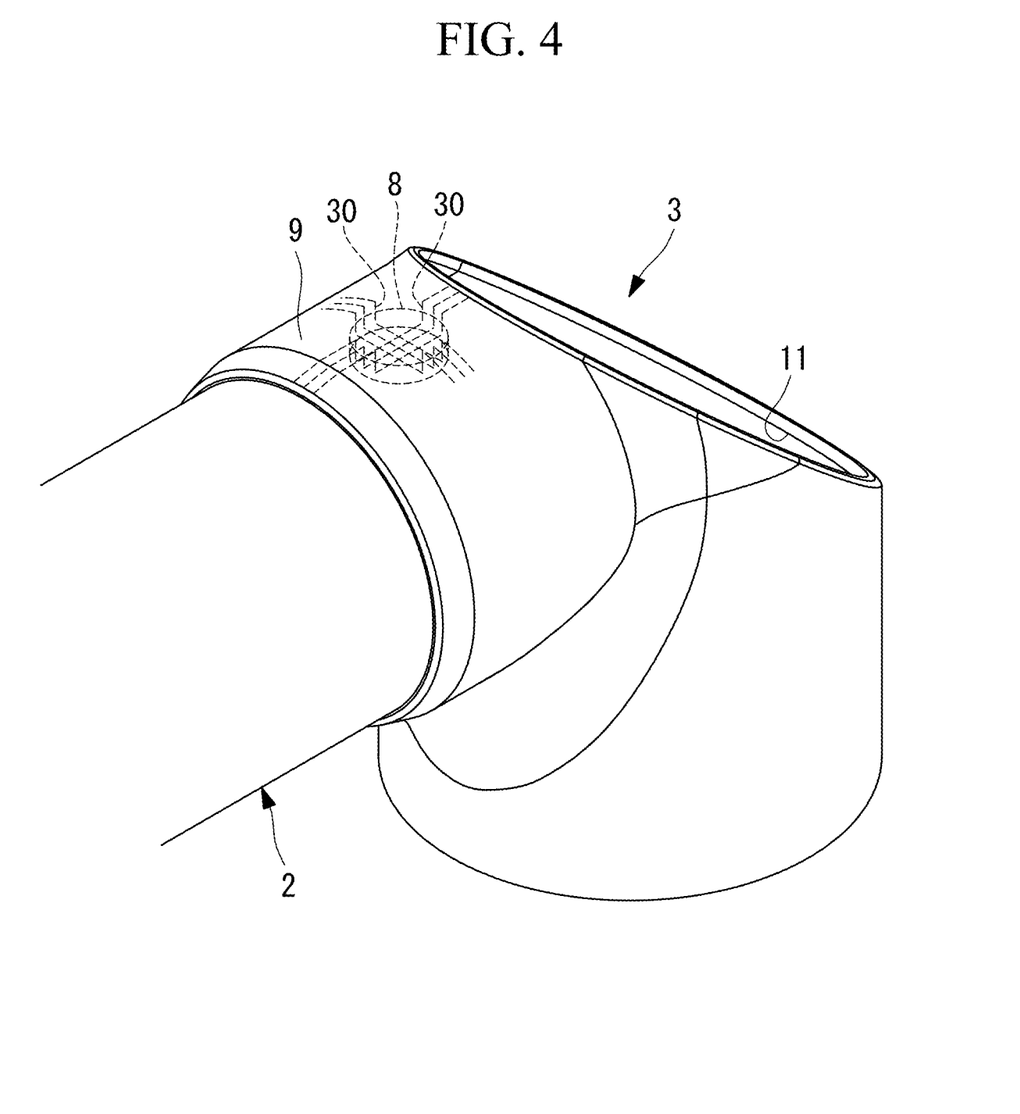
FIG. 4 is a perspective view illustrating reinforcement fibers constituting a main body and the attachment interface of the arm-shaped structure in FIG. 1.

As shown in FIG. 4, with regard to the direction in which the reinforcement fibers 30 in the resin constituting the main body 2 and the attachment interfaces 3 are oriented, at least some of the reinforcement fibers 30 are oriented in a direction perpendicular to the shearing direction of the through-holes 8 and the protrusions 10. In detail, at least some of the reinforcement fibers 30 are preferably oriented in a center-axis direction extending along the inner surface of each through-hole 8 and in a center-axis direction extending along the outer peripheral surface of each protrusion 10.

A manufacturing method of the arm-shaped structure 1 according to this embodiment having the above-described configuration will be described below.

Figure 5:
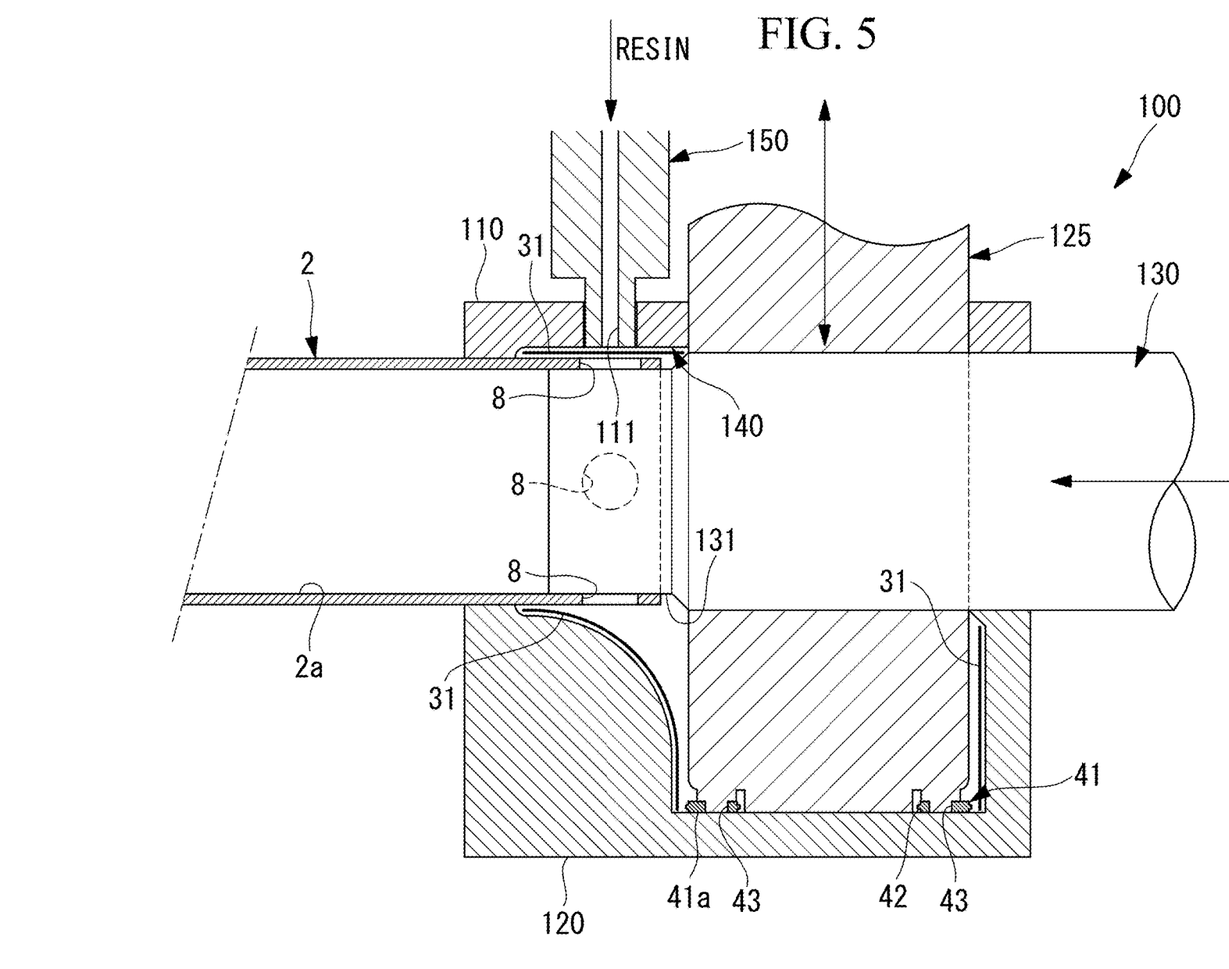
FIG. 5 is a vertical sectional view illustrating an example of a mold used for manufacturing the arm-shaped structure in FIG. 1.

The arm-shaped structure 1 according to this embodiment is manufactured by molding resin by using a mold 100 shown in FIG. 5 in accordance with an RTM (resin transfer molding) technique.

The mold 100 includes an upper mold 110 and a lower mold 120 that are openable and closable in the up-down direction, a cylindrical first movable mold 125 supported in such a manner as to be rectilinearly movable in the vertical direction, and a cylindrical second movable mold 130 extending through the first movable mold 125 and supported in such a manner as to be rectilinearly movable in the horizontal direction. The upper mold 110 includes a resin injection section 150 provided with a through-hole 111 for injecting resin. The distal end of the second movable mold 130 is provided with an engagement protrusion 131 engageable with the inner hole 2a of the main body 2 without any gaps therebetween.

The manufacturing method according to this embodiment first involves forming the through-holes 8 in the vicinity of the opposite ends of the main body 2. A preform 31 serving as an intermediate base material is disposed inside the mold 100. The preform 31 is preliminarily formed into the shape of a product molded in advance by using the continuous reinforcement fibers 30.

Because the reinforcement fibers 30 in the preform 31 have high strength in all directions, for example, the reinforcement fibers 30 may be stacked in four layers while shifting the orientation angle of the fibers in one direction by 45 degrees. The strength can be increased in a larger number of directions by splitting the angle into small angles.

Then, as shown in FIG. 5, one end of the main body 2 is inserted from one side in the horizontal direction into a space formed as a result of closing the upper mold 110 and the lower mold 120, so that the one end of the main body 2 is accommodated within the space. In a state where the metallic plate 41 is attached to the distal end of the first movable mold 125, the first movable mold 125 is inserted from above, and the second movable mold 130 is inserted horizontally from a direction opposite to the main body 2, whereby the engagement protrusion 131 is engaged with the inner hole 2a in the main body 2.

Accordingly, a cavity 140 corresponding to the attachment interface 3 is formed by the upper mold 110, the lower mold 120, the first movable mold 125, the second movable mold 130, and the outer surface of the main body 2.

Figure 6:
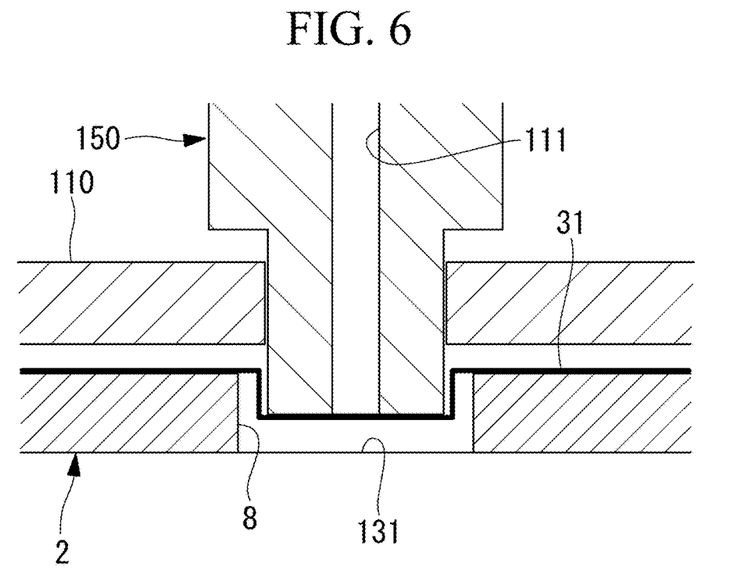
FIG. 6 is an enlarged vertical sectional view illustrating a state where a resin injection port is pressed into a preform in a manufacturing process of the arm-shaped structure in FIG. 1.
Figure 7:
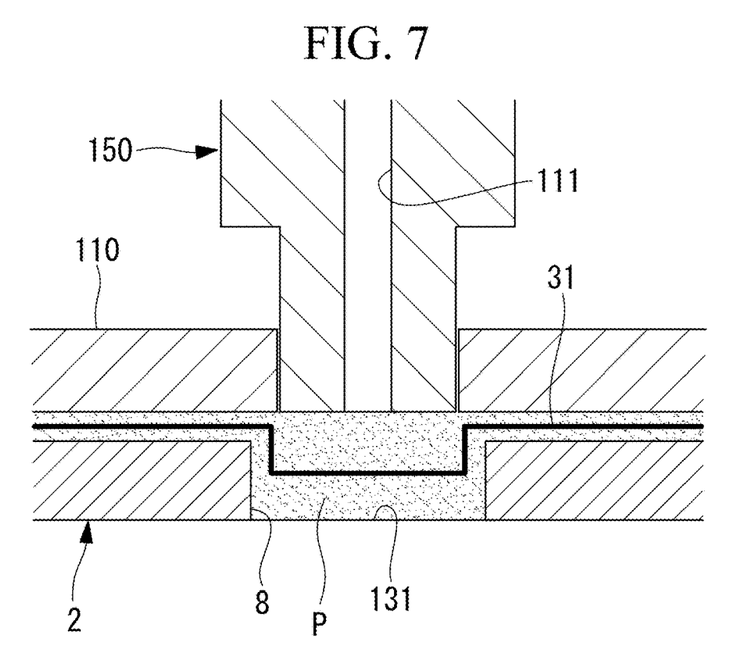
FIG. 7 is an enlarged vertical sectional view illustrating a state where the resin injection port is disposed away from the preform in the manufacturing process of the arm-shaped structure in FIG. 1.

Subsequently, the resin injection section 150 in the upper mold 110 is moved into the mold 100, and the distal end surface of the resin injection section 150 is brought into abutment with the preform 31 that is disposed inside the mold 100 and that is still soft. Then, as shown in FIG. 6, the resin injection section 150 is moved further into the mold 100, and the preform 31 is pressed into the through-holes 8, thereby deforming the preform 31. Subsequently, as shown in FIG. 7, the resin injection section 150 is slightly lifted upward from inside the mold 100 to dispose the resin injection section 150 and the preform 31 away from each other. Molten resin P is injected into the cavity 140 via the through-hole 111 provided in the resin injection section 150, whereby the attachment interface 3 can be formed at the one end of the main body 2.

Specifically, the attachment interface 3 is insert-molded by using the main body 2 as an insert component, whereby the arm-shaped structure 1 is manufactured.

The position of the through-hole 111 is not limited to the position shown in FIG. 5. An optimal position may be set in view of the orientation of the reinforcement fibers 30 in the resin.

Furthermore, the attachment interface 3 may be molded in a state where the metallic plate 41 is attached to the lower mold 120.

As the molten resin P is injected into the cavity 140 in the molding process of the attachment interface 3, the cylindrical engagement section 9 surrounding the one end of the main body 2 over a longitudinal range including the through-holes 8 is formed at a position where the engagement section 9 is in close contact with the outer peripheral surface of the main body 2. A portion of the molten resin P of the engagement section 9 flows into the through-holes 8 and extends radially inward from the inner surface of the engagement section 9, whereby the cylindrical protrusions 10 having a complementary shape with the through-holes 8 are formed.

Specifically, in the arm-shaped structure 1 according to this embodiment, the protrusions 10 formed during the injection process of the molten resin P are engaged with the through-holes 8 formed in the main body 2. Accordingly, the pair of attachment interfaces 3 joined to the opposite ends of the main body 2 can be secured to the main body 2 in a state where relative movement is regulated in the axial direction and the circumferential direction of the main body 2, that is, in a state where relative movement along the longitudinal axis of the main body 2 and around the longitudinal axis is prevented.

Specifically, the main body 2 and each attachment interface 3 are joined to each other in a state where relative movement along the longitudinal axis of the main body 2 and around the longitudinal axis is prevented by engaging the protrusions 10, which are formed when the attachment interface 3 is molded, with the through-holes (recesses) 8 in the main body 2.

The joint strength in the shearing direction can be enhanced in accordance with the engagement between the through-holes 8 and the protrusions 10, as compared with the case where the main body 2 is joined to each attachment interface 3 by using an adhesive alone.

Since the main body 2 and the attachment interfaces 3 are not integrally molded by using resin, the structure of the mold 100 can be relatively simplified. In particular, because the long main body 2 has a shape of a metallic pipe, a core does not need to be disposed over the entire length of the main body 2 during the molding process of the attachment interfaces 3, thereby advantageously facilitating the manufacturing process.

Furthermore, the second movable mold 130 having the engagement protrusion 131 that engages with the inner hole 2a in the main body 2 blocks the through-holes 8 in the main body 2 from the inside, so as to prevent the molten resin P from leaking into the main body 2.

Moreover, the first movable mold 125 and the second movable mold 130 movable relative to the upper mold 110 and the lower mold 120 that open and close in the up-down direction are provided. Accordingly, the work opening 11 communicating with the inner hollow section 4 can be formed in each attachment interface 3 located in the paths of the first movable mold 125 and the second movable mold 130.

According to this embodiment, since the attachment interfaces 3 are composed of a carbon-fiber-reinforced plastic identical to the resin used for forming the main body 2, the fusion between the resin of the main body 2 and the resin of the attachment interface 3 can enhance the joint strength.

Because at least some of the reinforcement fibers 30 are oriented in the direction perpendicular to the shearing direction of the through-holes 8 and the protrusions 10, the strength against a shearing force acting on the protrusions 10 in the axial direction or the circumferential direction of the main body 2 can be significantly increased.

Although each attachment interface 3 is molded in accordance with the RTM (resin transfer molding) technique in the above example, the embodiment is not limited to this.

For example, each attachment interface 3 may be molded using an autoclave in accordance with an autoclave technique involving using a sheet-like intermediate member called prepreg having resin impregnated in the reinforcement fibers 30 and curing resin while performing heating, pressing, and vacuuming thereon.

Furthermore, a VaRTM (vacuum-assisted resin transfer molding) technique may be used. This technique involves using the lower mold 120 alone without using the upper mold 110, covering the upper surface with a film pack, and impregnating resin by utilizing a vacuuming force instead of pressure.

Moreover, a press-molding technique may be used. This technique involves closing the upper mold 110 and the lower mold 120 and curing prepreg or an SMC (sheet molding compound) substrate while applying pressure thereto. An SMC (sheet molding compound) technique as a type of a press-molding technique involves disposing SMC substrates stacked in the form of sheets inside the mold 100 and pressurizing and fluidizing the SMC substrates by using a pressing machine. This molding technique may also be used.

In any case, the continuous reinforcement fibers 30 may be disposed and molded in areas that are to become the protrusions 10 as a result of molding such that the continuous reinforcement fibers 30 are oriented in the direction perpendicular to the direction of the shearing force applied to the protrusions 10.

Although the main body 2 is composed of a carbon-fiber-reinforced plastic in this embodiment, the configuration is not limited to this. The material used for the main body 2 may be metal, such as an aluminum alloy or a magnesium alloy. Obviously, the main body 2 may be composed of resin that does not contain the reinforcement fibers 30. As another alternative, each attachment interface 3 may be composed of metal, such as an aluminum alloy or a magnesium alloy, and be set as a metal insert in the mold 100, and the main body 2 may be molded by using a carbon-fiber-reinforced plastic.

As an alternative to the above example in which the through-holes 8 provided in the main body 2 are circular in cross section, the through-holes 8 may have an arbitrary cross-sectional shape. Moreover, the size of the cross-sectional shape may be arbitrary. The through-holes 8 and the protrusions 10 preferably have a non-angular shape to avoid stress concentration.

The number of through-holes 8 provided in the main body 2 may be one or more. It is desirable that the number of through-holes 8 be set such that the main body 2 has enough strength to prevent the engagement sections 9 from falling out or rotating as a result of shear-fracturing of the protrusions 10 or the recesses 12. In order to ensure high strength, multiple through-holes 8 may be disposed evenly around the main body 2.

Figure 8:
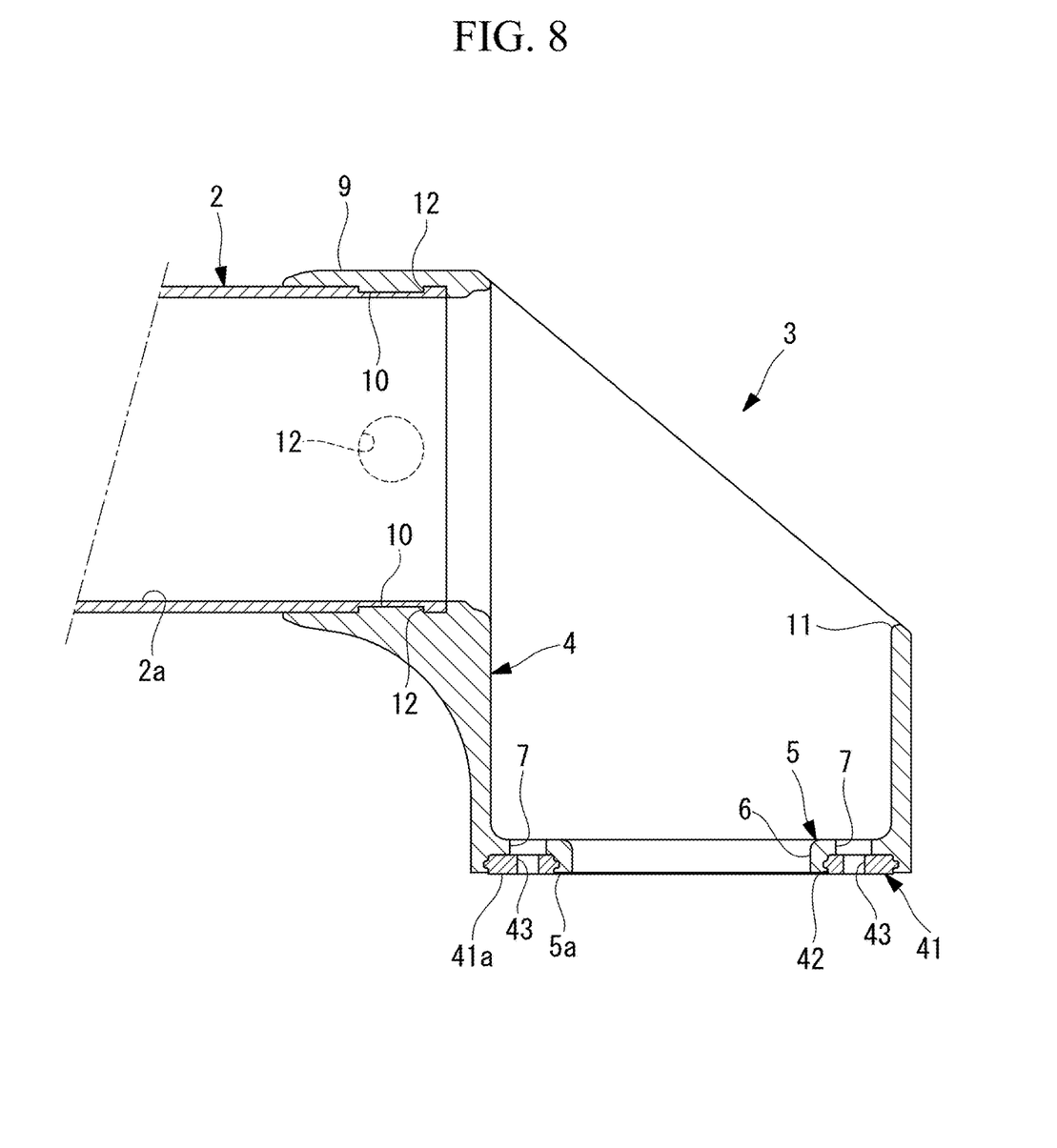
FIG. 8 is a partial vertical sectional view of the attachment interface and illustrates a first modification of the arm-shaped structure in FIG. 1.

Although the recesses provided in the main body 2 are the through-holes 8 in this embodiment, the configuration is not limited to this. As shown in FIG. 8, recesses 12 extending radially inward from the outer peripheral surface of the main body 2 but not extending therethrough may be employed. With this configuration, the through-holes 8 do not need to be blocked by the second movable mold 130, thereby further simplifying the structure of the mold 100.

Figure 9:
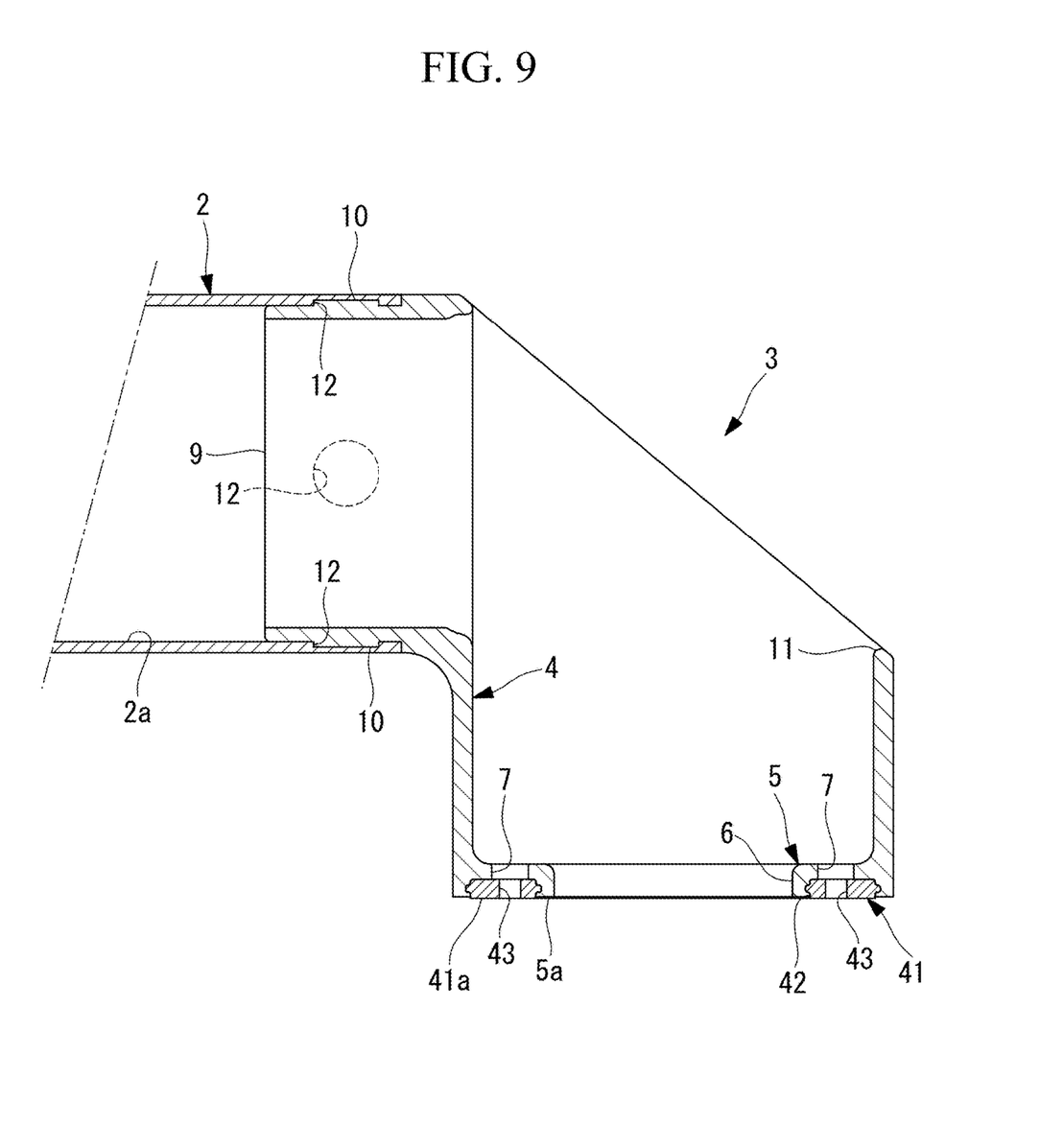
FIG. 9 is a partial vertical sectional view of the attachment interface and illustrates a second modification of the arm-shaped structure in FIG. 1.

The recesses 12 may be recessed radially inward from the outer peripheral surface of the main body 2 or may be recessed radially outward from the inner peripheral surface of the main body 2. If the recesses 12 are provided in the inner peripheral surface, the engagement section 9 of each attachment interface 3 may be cylindrical to engage with the inner peripheral surface of the main body 2, as shown in FIG. 9.

Figure 10:
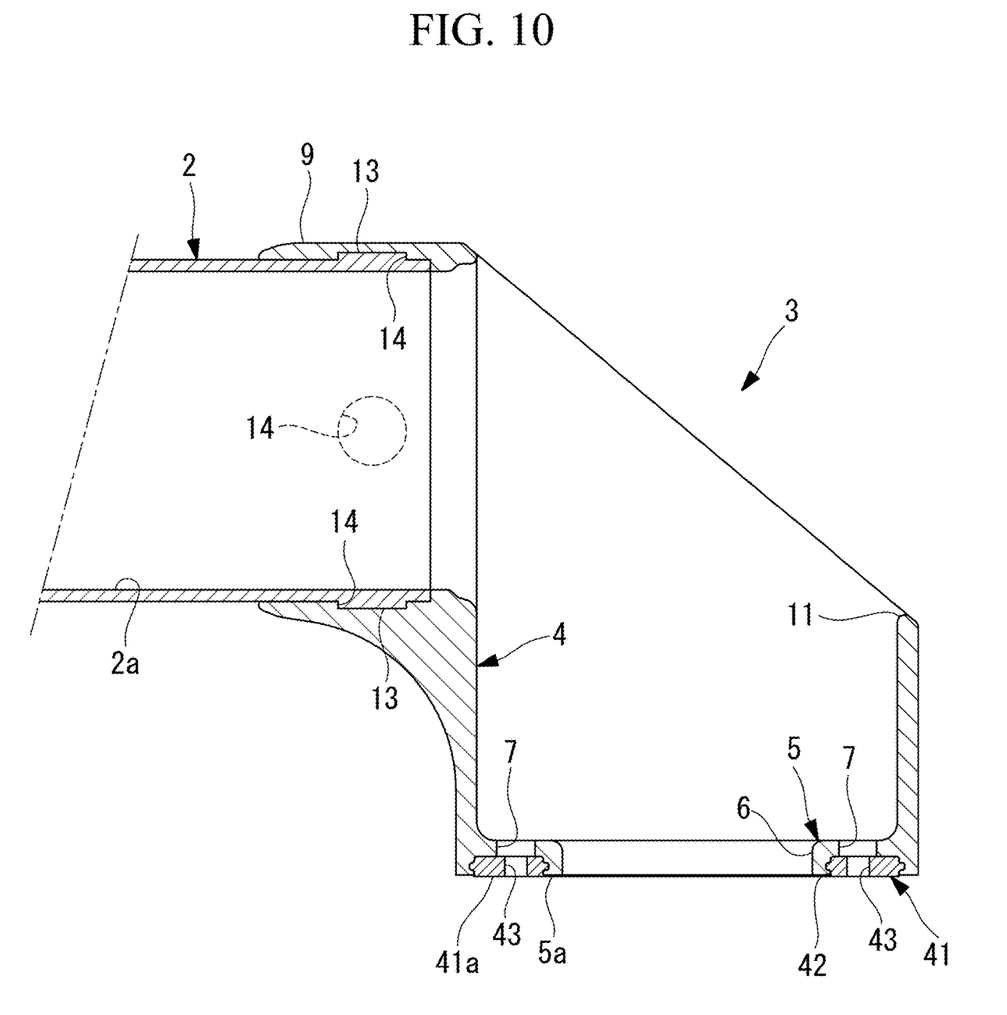
FIG. 10 is a partial vertical sectional view of the attachment interface and illustrates a third modification of the arm-shaped structure in FIG. 1.

Furthermore, as shown in FIG. 10, the recesses 12 may be replaced by protrusions 13 extending radially from the outer peripheral surface or the inner peripheral surface of the main body 2. In this case, as shown in FIG. 10, each attachment interface 3 has recesses 14 that have a complementary shape with the protrusions 13 and that accommodate the protrusions 13.

Figure 11:
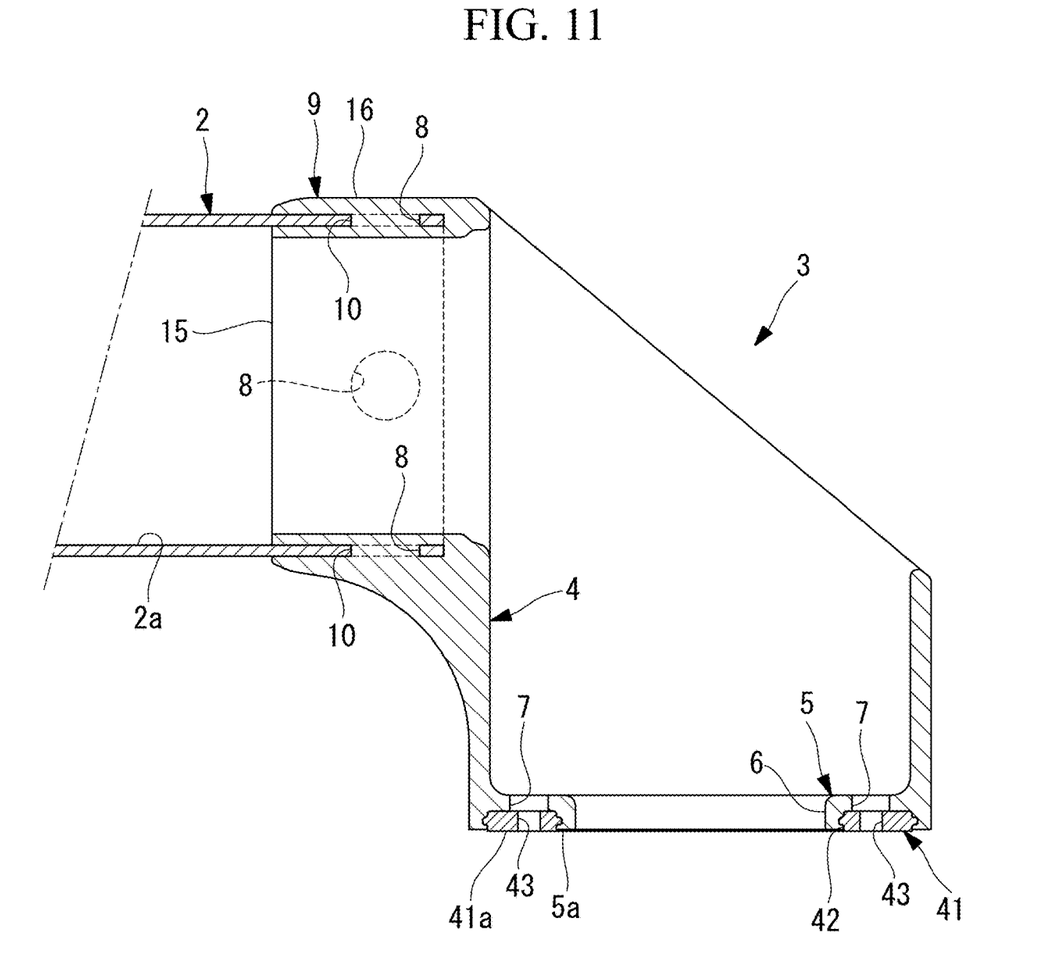
FIG. 11 is a partial vertical sectional view of the attachment interface and illustrates a fourth modification of the arm-shaped structure in FIG. 1.

Furthermore, as shown in FIG. 11, the engagement section 9 of each attachment interface 3 may have both an inner engagement section 15 that engages with the inner peripheral surface of the main body 2 and an outer engagement section 16 that engages with the outer peripheral surface of the main body 2. In this case, the protrusions 10 formed within the through-holes 8 of the main body 2 have a columnar shape to couple the inner engagement section 15 and the outer engagement section 16 to each other. Accordingly, the attachment interface 3 and the main body 2 can be joined to each other more securely.

Figure 12:
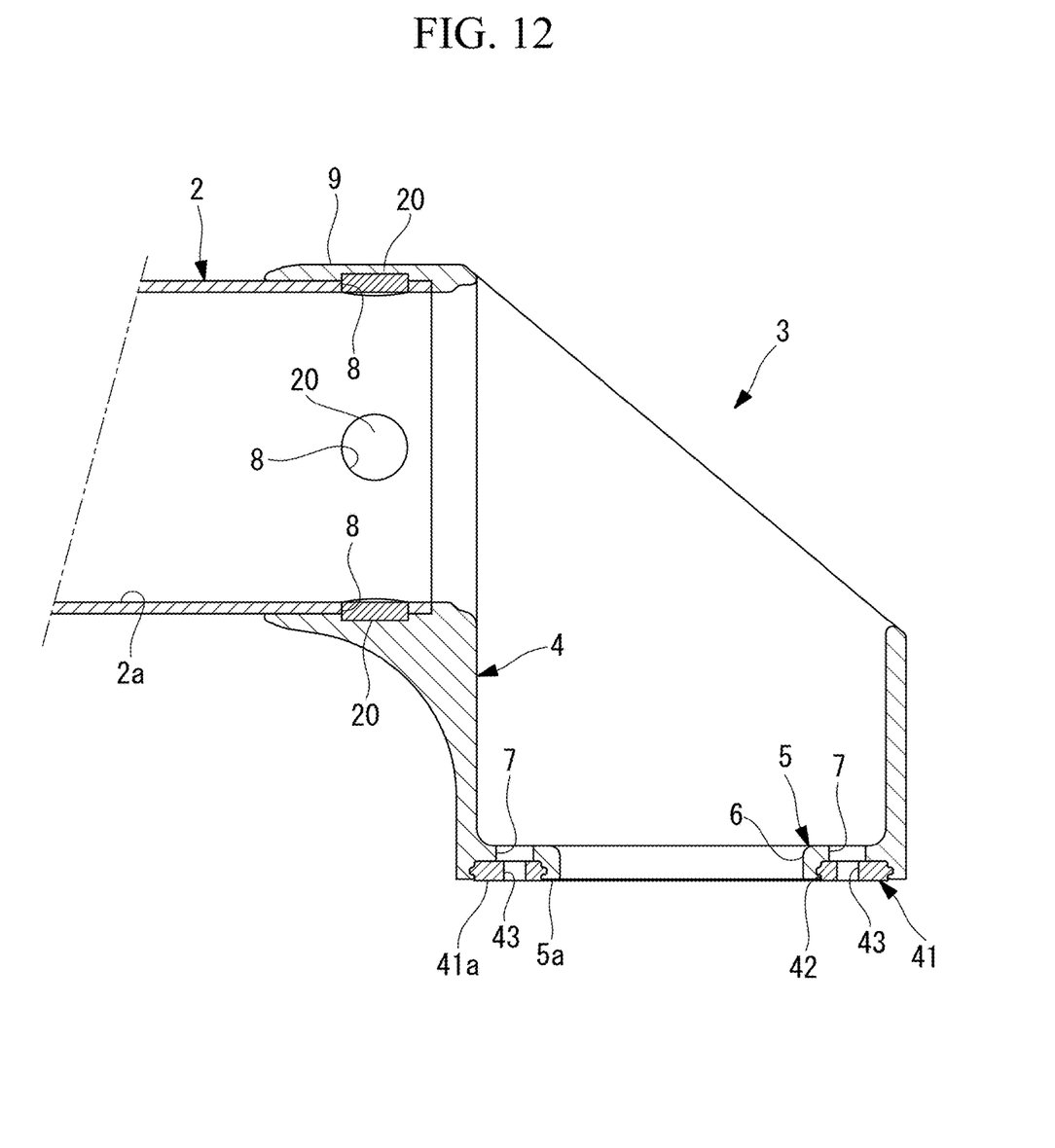
FIG. 12 is a partial vertical sectional view of the attachment interface and illustrates a fifth modification of the arm-shaped structure in FIG. 1.

Furthermore, as shown in FIG. 12, another member (such as a metal or a fiber-reinforced plastic) 20 different from the main body 2 or the attachment interface 3 may be set as an insert in the mold 100 together with the main body 2, and the attachment interface 3 may be subsequently formed by molding.

Alternatively, although not shown, a metallic or fiber-reinforced-plastic reinforcement member having through-holes may be set as an insert within the main body 2 together with the main body 2.

As an alternative to this embodiment in which the arm-shaped structure 1 has the attachment interfaces 3 at the opposite ends of the main body 2, only one end thereof may have the attachment interface 3. As an alternative to the above example where the flanges 5 are provided parallel to the longitudinal axis of the arm-shaped structure 1, the flanges 5 may extend in a direction intersecting the longitudinal axis of the arm-shaped structure 1. As an alternative to the above example where a robot arm is described as the arm-shaped structure 1, it may be applied to another arbitrary arm-shaped structure.

Furthermore, the attachment interfaces 3 at the opposite ends may be molded in advance in another process, and then be set in an injection mold for the main body 2. By subsequently forming the main body 2 by injection-molding, the main body 2 and the attachment interfaces 3 can be integrated with each other.

The main body 2 is not limited to having the shape of a straight round pipe, and may have a shape that increases in diameter toward the opposite ends thereof, or may have the shape of a square pipe.

The main body 2 or the attachment interfaces 3 composed of a carbon-fiber-reinforced plastic may have a resin area that does not contain the reinforcement fibers 30.

Although a carbon-fiber-reinforced plastic is described as an example, the reinforcement fibers 30 are not limited to carbon fibers and may be fibers composed of an arbitrary material, such as glass fibers or aramid fibers. The base resin material may be thermoplastic resin or thermosetting resin.

The mechanical joint strength according to the engagement between the through-holes 8 and the protrusions 10 is basically determined in accordance the shear strength. If there is a gap between the through-holes 8 and the protrusions 10, the through-holes 8 and the protrusions 10 move relatively to each other during use, thus lowering the positioning accuracy of the robot arm. Therefore, the gap between the through-holes 8 and the protrusions 10 may be filled with an adhesive. For example, an adhesive that completely fills the gap by being melted with heat may be additionally used.

Although the embodiment of the present invention has been described above, it is clear to a skilled person that various alterations and modifications are achievable so long as they do not depart from the scope disclosed in the claims to be described below. An appropriate combination of some features of the above-described embodiment or an embodiment according to a non-described manufacturing method are also included in the scope of the present disclosure.

The invention claimed is:

1. An arm-shaped structure, comprising:
   a tubular main body; and
   an attachment interface joined to at least one end of the main body and securable to another component,
   wherein the main body and the attachment interface are joined to each other in a state where relative movement along a longitudinal axis of the main body and around the longitudinal axis is prevented in accordance with engagement between a recess provided in one of the main body and the attachment interface and a protrusion provided in the other one of the main body and the attachment interface,
   wherein at least one of a periphery of the recess and the protrusion is formed by resin containing a continuous reinforcement fiber, and
   wherein at least a portion of the continuous reinforcement fiber is oriented in a center-axis direction extending along an inner surface of the recess and in a center-axis direction extending along an outer peripheral surface of the protrusion.

2. The arm-shaped structure according to claim 1, wherein the attachment interface is insert-molded by using the main body as an insert component.

3. A robot comprising at least one arm-shaped structure according to claim 1.

* * * * *